T. F. PHILIPPI.
CLUTCH.
APPLICATION FILED JAN. 8, 1909.
920,176.
Patented May 4, 1909.
2 SHEETS—SHEET 1.
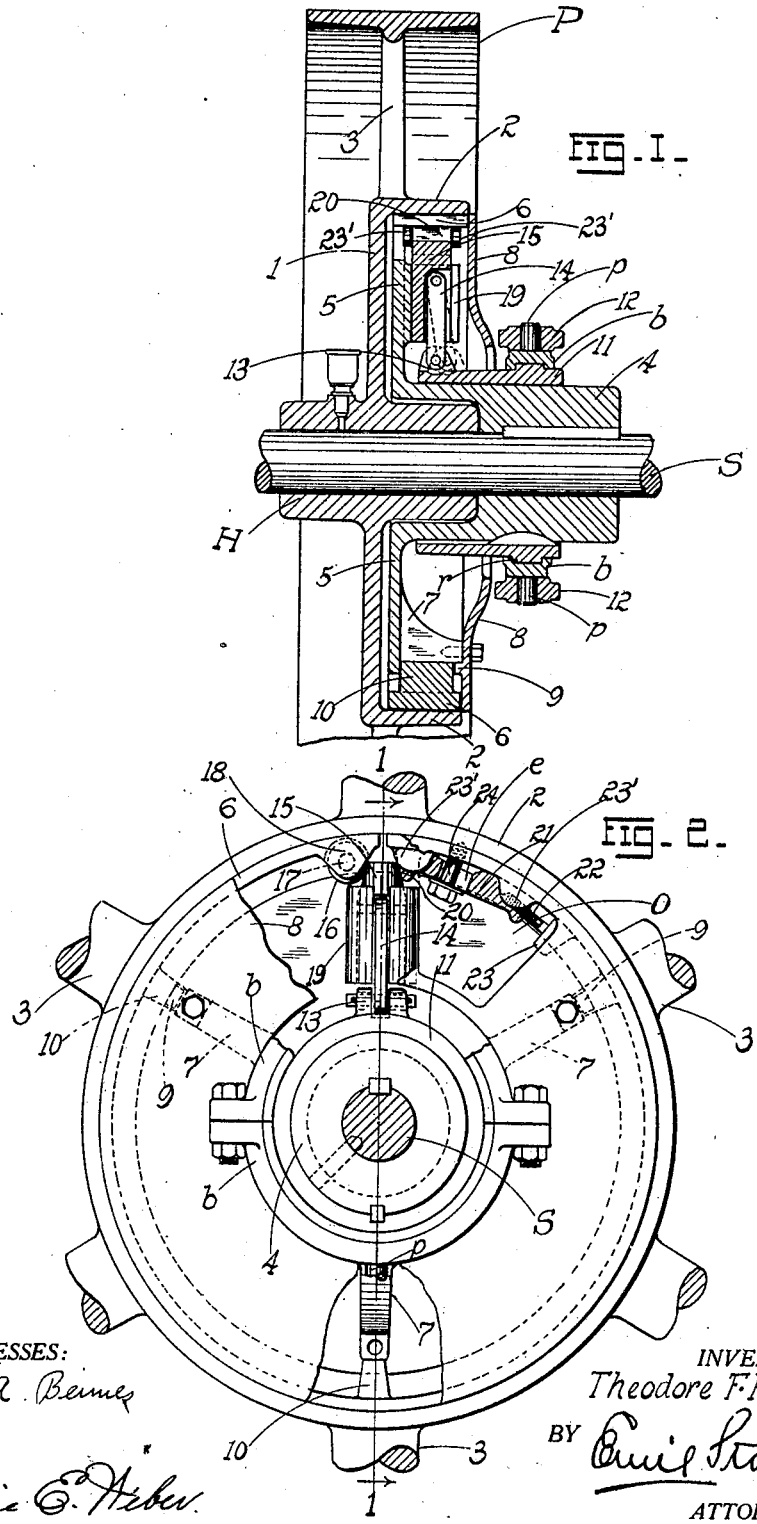

T. F. PHILIPPI.
CLUTCH.
APPLICATION FILED JAN. 8, 1909.
920,176.
Patented May 4, 1909.
2 SHEETS—SHEET 2.
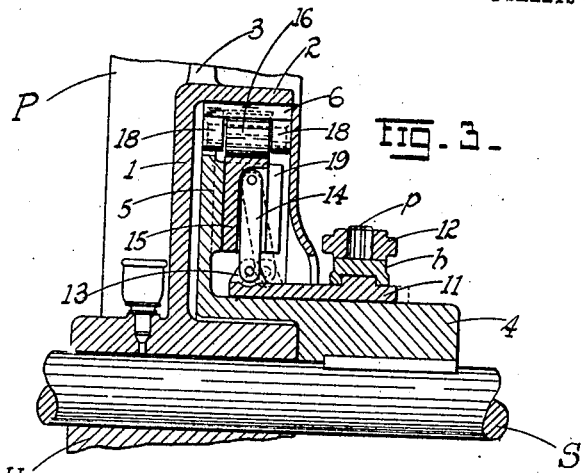
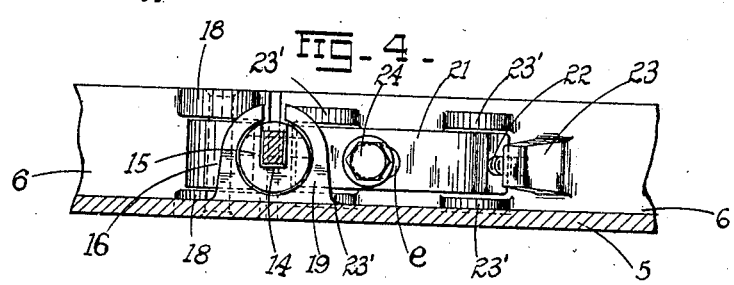
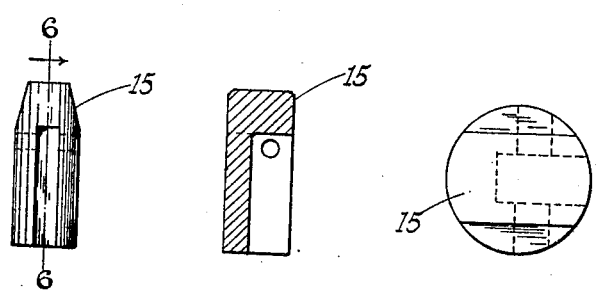
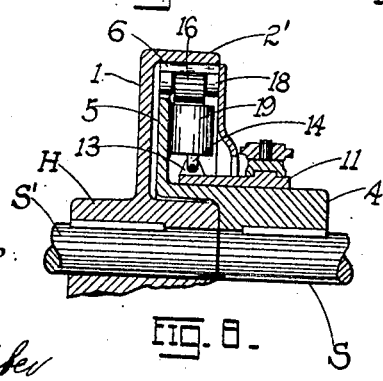
WITNESSES:
Harry A. Beines
Fannie E. Weber
INVENTOR.
Theodore F. Philippi.
BY Emil Starer
ATTORNEY.

UNITED STATES PATENT OFFICE.

THEODORE F. PHILIPPI, OF EAST ST. LOUIS, ILLINOIS.

CLUTCH.

No. 920,176.

Specification of Letters Patent.

Patented May 4, 1909.

Application filed January 8, 1909. Serial No. 471,219.

*To all whom it may concern:*

Be it known that I, THEODORE F. PHILIPPI, citizen of the United States, residing at East St. Louis, in the county of St. Clair and State of Illinois, have invented certain new and useful Improvements in Clutches, of which the following is a full, clear, and exact description, reference being had to the accompanying drawings, forming a part hereof.

My invention has relation to improvements in friction clutches; and it consists in the novel construction of clutch more fully set forth in the specification and pointed out in the claims.

In the drawings, Figure 1 is a middle vertical transverse section on the line 1—1 of Fig. 2; Fig. 2 is a front elevation with spokes and rim of pulley and shifting yoke removed, the drive-shaft being in section; Fig. 3 is an enlarged middle section on line 1—1 of Fig. 2 of the operating parts of the clutch, with however, the bearing-roller for the wedge shown in elevation; Fig. 4 is an inside view of the portion of the split friction ring carrying the parts which coöperate with the wedge; Fig. 5 is a front elevation of the wedge; Fig. 6 is a longitudinal section on the line 6—6 of Fig. 5; Fig. 7 is a top plan of Fig. 5; and Fig. 8 is a sectional view showing the application of the device as a shaft-coupling.

The object of my invention is to provide a friction clutch for loose belt-pulleys (and other rotatable members) the operating parts of which will in the main be confined within the planes of the opposite faces of the pulley, thereby avoiding dangerous projections while in rotation.

A further object is to provide a clutch composed of a minimum number of parts, one which takes up a minimum amount of space on the shaft, one permitting of ready adjustment, and one possessing further and other advantages better apparent from a detailed description of the invention which is as follows:—

Referring to the drawings, and for the present to Figs. 1 to 7 inclusive, S, represents a drive-shaft on which is mounted the loose pulley P, the hub H whereof preferably extends slightly beyond the planes of the opposite faces of the pulley as shown in order to increase the wearing qualities of both hub and shaft. Formed with the hub H is a wall or member 1 whose marginal flange or friction rim 2 constitutes the relatively stationary or female member of the clutch mechanism, by which the pulley is rigidly clamped to the shaft when occasion requires. From the periphery of the wall 1 radiate the spokes 3 to the rim of the pulley. The wall 1, with its friction rim or flange 2, and hub H, collectively form an annular housing or chamber within which the majority of the operating parts of the clutch are confined, leaving no projecting parts to strike the operator or machinist who may approach the pulley too closely while the latter is rotating. Keyed to the shaft S, and shouldered against the hub H is the hub portion or bearing 4 of a disk 5 extending contiguous to the wall 1, said disk 5 serving to support the split friction band or ring 6 as the disk rotates in conjunction with the shaft. The support of the ring 6 by the disk 5 is effected as follows:— Cast with the disk 5 are a series of posts or pillars 7 projecting at right angles to the outer faces of the disk, the free ends of the posts serving as means of support for the cover plate 8 (provided with a hand hole O at a convenient point for a purpose to presently appear) bolted thereto, said plate being provided with formations or lugs 9 shouldering the plate against the posts as shown. Between the inner faces of the lugs 9 and the outer face of the disk 5 play the rib formations 10 cast with the friction ring 6, so that the ring 6 is virtually confined between the disk 5 and the cover plate 8 bolted thereto, and with the edges of the ribs 10 likewise bearing against the outer walls of the posts 7, it follows that shifting of the friction ring 6 is impossible.

Mounted loosely over the bearing 4 of the disk 5, and projecting well into the pulley is a sleeve 11 which may be reciprocated in line of the axis of the shaft S by any well known form of shifting yoke, the terminals of whose arms 12 only are shown herein, the arms being passed over the pins $p$ of the sectional band $b$ encircling the annular rib $r$ of the sleeve, although any equivalent connection may be resorted to, as may suit the builder, and as well understood in the art. At the inner end of the sleeve are formed ears or lugs 13 between which is pivotally secured the inner end of a link 14 whose outer end is pivoted between the side walls of a chambered block or wedge 15 whose outer beveled terminal plays between the terminals or ends of the split friction ring 6. In order that the forcing apart or separation of these ends may be attended with a minimum amount of friction, an anti-friction roller 16 is mounted on a spindle 17 between ears 18, 18 formed on the ring for engaging one of the faces of the bevel terminals of the wedge. The wedge 15 is supported in the rear by the disk 5, at the bases of the lateral guide wings 19 formed on the disk, between which wings the wedge plays. The opposite face of the bevel terminal of the wedge plays over the terminal nose 20 of a plate 21 bolted to the ring 6, the opposite end of the plate being provided with an adjustment screw 22 whose projecting end rests on a lug or bearing 23 cast with the friction ring. The purpose of the plate or member 21 is merely to take up wear of the parts, the bolt 24 passing through an elongated opening $e$ to allow for the necessary adjustment of the nose as it wears away, the adjustment being accomplished by giving the screw 22 a turn or two in proper direction to advance the nose-plate toward the split in the ring 6. The nose-plate is guided between lobes or ears 23' formed on the ring 6, said ears being somewhat smaller than the ears 18, 18 between which is mounted the roller 16.

The operation is of course perfectly obvious from the drawings. As the operator shifts the sleeve 11 toward the pulley, the link 14 will drive the wedge 15 toward the periphery of the pulley, the bevel end of the wedge thus driving the ends of the friction ring 6 apart, thereby forcing the periphery of the ring into frictional engagement with the inner surface of the friction ring 2 or female section of the clutch (the ring 6 constituting the male); and since the disk 5 which carries the ring 6 is keyed to the shaft S and rotates with it, it follows that the moment the frictional contact between the parts 6 and 2 is sufficient, the pulley of which the rim 2 forms a part will rotate with the ring 6, and hence with the shaft. A movement of the sleeve 11 away from the pulley of course retracts the wedge, allowing the ring 6 to spring away from the rim 2 and the pulley again comes to a stop.

It will be seen that all the actuating parts are confined in the annular chamber formed by the wall 1 and the rim 2, within the planes of the opposite faces of the pulley (or planes touching the opposite edges of the pulley-rim), and there is nothing to project to strike the operator. The diameter of the wall 1 of course, may vary but in practice it is preferably slightly in excess of the radius of the pulley rim.

In Fig. 8 I show the device applied as a shaft-coupling. In that case the friction rim or female clutch member 2' is keyed to a separate shaft S', which terminates at the shaft S carrying the male clutch-member or friction ring 6. It is obvious that when the ring 6 engages the rim 2', the shafts S, and S' will be coupled, and rotate in unison.

It may be stated in conclusion that the obvious purpose of the opening O in the cover plate 8 is to provide ready access to the wearing plate 21 and its adjusting screw 22.

Having described my invention, what I claim is:—

1. In combination with a rotatable shaft, a belt-pulley mounted loosely thereon, a disk confined between the terminal boundaries of the pulley-rim and provided with a hub keyed to the shaft, a friction rim formed on the pulley within the pulley rim and encircling the disk aforesaid, a series of posts projecting from one face of the disk, a cover-plate passed over the shaft and secured to said posts, a series of lugs formed on the inner face of the cover plate, a split friction ring or band confined between the disk and cover plate and provided with ribs engaged at one end by the lugs of the cover plate, and at the opposite end engaging the disk, the inner edges of the ribs bearing against the outer edges of the posts aforesaid, a sliding sleeve mounted on the disk-hub, a wedge guided to reciprocate on the disk to and from the ends of the split friction ring, and a link pivotally connected to the wedge and sleeve respectively.

2. In combination with a rotatable shaft, a belt-pulley mounted loosely thereon, a disk confined between the planes of the opposite faces of the pulley and having a hub keyed to the shaft, a friction rim formed on the pulley around the disk, a split friction ring loosely coupled to the disk and rotatable therewith and disposed interiorly to the friction rim, a sliding sleeve mounted on the disk-hub, a wedge mounted to reciprocate on the disk to and from the ends of the split ring, a link pivotally coupled to the wedge and sleeve respectively, an anti-friction roller mounted on one side of the separated ends of the split ring for engaging one side of the wedge, and a wearing member or plate secured along and bearing against the inner face of the split ring on the opposite side of the wedge and adjustable to and from the ends of the split ring.

3. In combination with a split friction ring, a wearing plate terminating at the end adjacent to the split in a suitable nose formation, a lug formed on the ring, an adjusting screw interposed between the lug and plate and adapted to advance the latter upon rotation of the screw in one direction, the plate having an elongated slot formed therein, and a bolt operating in said slot and coupling the plate to the ring.

In testimony whereof I affix my signature, in presence of two witnesses.

THEODORE F. PHILIPPI.

Witnesses:
EMIL STAREK,
FANNIE E. WEBER.